United States Patent [19]
Jurado

[11] 3,881,360
[45] May 6, 1975

[54] MEASURING DISPENSING DEVICE
[76] Inventor: Rodrigo Jurado, 13602 Circle A Trl., Helotes, Tex. 78023
[22] Filed: July 9, 1973
[21] Appl. No.: 377,773

[52] U.S. Cl................................. 73/425.6; 222/309
[51] Int. Cl................................................ B01l 3/02
[58] Field of Search .................. 73/425.4 P, 425.6; 222/309; 128/218 A, 218 P, 218 PA

[56] References Cited
UNITED STATES PATENTS
3,162,217   12/1964   Poli, Jr. et al. ..................... 222/309
3,290,946   12/1966   Pursell ............................... 73/425.6
3,615,492   7/1972    Tejera ................................ 73/425.6

Primary Examiner—S. Clement Swisher
Attorney, Agent, or Firm—Stein and Orman

[57] ABSTRACT

A volumetric measuring pump for measuring a fixed volume of fluid comprising a hollow syringe body having an elongated slot formed in the side thereof, a detachable measuring tube attached to one end thereof, an elongated cylindrical plunger partially disposed within the opposite end of the syringe body and limit means formed on the cylindrical plunger disposed to cooperate with the elongated slot to limit the movement of the plunger relative to the syringe body to control the volume of fluid drawn into the detachable measuring tube.

9 Claims, 3 Drawing Figures

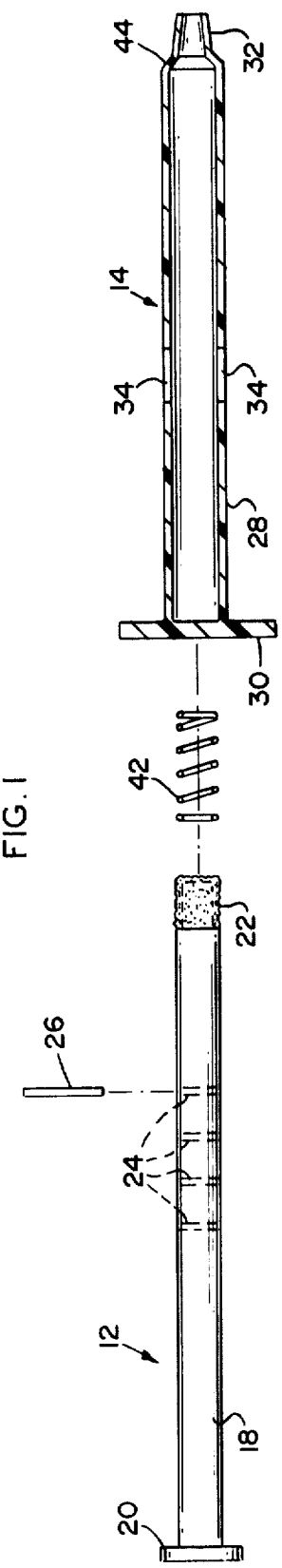
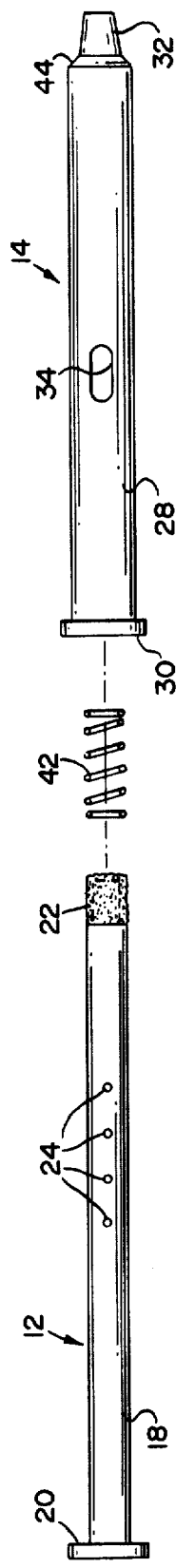
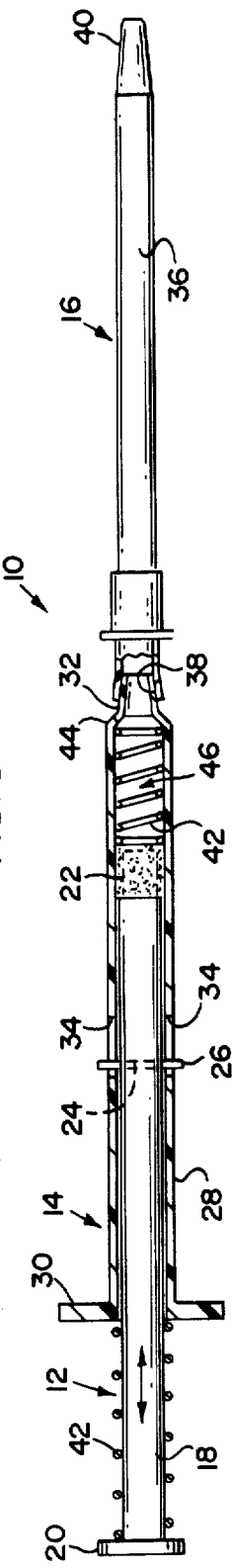

MEASURING DISPENSING DEVICE

BACKGROUND OF THE INVENTION

1. Field of the Invention

A volumetric measuring pump comprising a syringe body and a detachable measuring tube wherein the syringe body includes a limit means to control the volume of fluid drawn into the detachable measuring tube.

2. Description of the Prior Art

Devices for measuring and dispensing a predetermined quantity of a fluid are generally known in the art. These devices cover a broad spectrum of designs and constructions from the mouth-operated pipette to complex and costly automated devices. However, all such prior art devices are deficient in one or more respects.

While the mouth-operated pipettes are economical to manufacture and are relatively simple to use, they are unsuitable for many uses. Because they are mouth-operated, the user may be exposed to ingestion or inhalation of harmful and even poisonous substances. Furthermore, such pipettes are not suitable for work requiring a high degree of accuracy, for their accuracy is directly limited by that of the user. Finally, such pipettes are inefficient for the reason that they must be cleaned after each use so that test fluids are not inadvertently mixed during successive measurements.

Automated pipette devices possess similar disadvantages. Their cost, size and complexity of construction and operation make them unsuitable for most users. Furthermore, many of these devices may not be used on a series of test fluids for the same reason that to so use them without prior cleaning would result in mixing of test fluids.

Between the extremes of mouth-operated and automated pipette devices various syringe-like devices are known in the art. Such devices are generally unsuitable in that they comprise complex and cumbersome superstructures formed on the syringe body, whereby the quantity of fluid drawn and dispensed is controlled. Moreover, many such devices are not capable of attaining the repeatable degree of accuracy required in medical laboratory procedures. Two such devices are disclosed in U.S. Pat. Nos. 2,792,834 and 2,874,694. However, neither of these devices disclose the limit means of the present invention.

From the foregoing it is apparent that there exists a great need for a simple, inexpensive and accurate device for measuring and dispensing a fixed quantity of fluid. It is further desirable that such a device should include means whereby it could be used for measuring and dispensing a variety of fluids without the necessity of cleaning the device between each use. Finally, it is clearly desirable that the device be constructed so that the operator will not be unnecessarily exposed to any dangerous fluids during the measuring and dispensing procedures.

SUMMARY OF THE INVENTION

This invention relates to a volumetric measuring pump. More specifically, the volumetric measuring pump comprises a plunger means, syringe means and detachable measuring tube.

The plunger means comprises an elongated barrel having a thumb rest formed on one end thereof and a suction head seal formed on the opposite end thereof. A transverse bar-like member extends outwardly from each side of the elongated barrel.

The syringe means comprises a hollow body configured to partially house the plunger means. A finger rest is formed on one end of the hollow body and an attachment means, comprising a tapered point, at the opposite end. A pair of elongated slots extend longitudinally along opposite sides of the hollow body. When assembled, opposite ends of a bar-like member extends through the slots to cooperatively form a limit means to limit the reciprocal movement of the plunger means within the hollow body.

The detachable measuring tube comprises an elongated hollow sleeve having a tapered metering orifice attached to the syringe means.

In assembled form, plunger means is biased outwardly relative to the syringe body by a bias means such that the inner end of the suction head seal and inner end of the syringe body cooperatively form a suction head chamber.

To operate, the pump is grasped and the plunger means is depressed inwardly into syringe means until bar-like cross member engages the lower end of slots to limit the inward movement of plunger means relative to the syringe. As the plunger means moves inwardly, air is forced out of the chamber in advance of the seal.

Once the chamber is exhausted the detachable measuring tube is placed in the fluid to be drawn to the predetermined measured volume. As pressure is released from the plunger means the bias means forces the plunger means outward relative to the syringe means creating a vacuum in the chamber drawing fluid into detachable measuring tube until bar-like cross member engages the outer limit of the slots.

The length of the slots determines the volume of fluid measured. It should be noted that at no time does the fluid enter the syringe means. Thus, a single plunger means/syringe means may be used with several different detachable measuring tubes without contamination of any of the fluid sample.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is an exploded cross-sectional side view of a volumetric measuring pump.

FIG. 2 is an exploded side view of a volumetric measuring pump.

FIG. 3 is a cross-sectional side view of an assembled volumetric measuring pump.

Similar reference characters refer to similar parts throughout the several views of the drawings.

DETAILED DESCRIPTION OF THE PREFERRED EMBODIMENT

As shown in FIGS. 1 through 3, the volumetric measuring pump generally indicated as 10 comprises plunger means 12, syringe means 14 and detachable measuring tube 16.

As best shown in FIGS. 1 and 2, plunger means 12 comprises an elongated cylindrical barrel 18 having a thumb rest 20 formed on one end thereof and a suction head seal 22 attached to the opposite end thereof. One or more mounting channels 24 are formed laterally across cylindrical barrel 18 to accommodate or seat stop means in the form of pin means 26 extending from at least one and preferably both sides of cylindrical barrel 18 (FIG. 3). The relative dimensions of the pin means 26 and mounting channels 24 are such as to allow easy removal of the pin 26 and placement thereof in another channel. This placement of pin 26 in a plurality of channels causes the defining of the displacement of plunger 12 in syringe 28 and the capacity of chamber 46.

As best shown in FIGS. 1 and 2, syringe means 14 comprises a hollow tubular body 28 having a finger rest 30 formed on one end thereof and a tapered point 32 formed on the opposite end thereof. A pair of elongated slots 34 extend longitudinally along opposite sides of tubular body 28. As shown in FIG. 3, elongated slots 34 are arranged such that when plunger means 12 is disposed within syringe means 14, stop means 26 extends therethrough to cooperatively form limit means to limit the reciprocal movement of plunger 12 relative to syringe means 14.

As shown in FIG. 3, detachable measuring tube 16 comprises an elongated hollow sleeve 36 having an enlarged opening 38 at one end and a tapered orifice 40 formed at the opposite end. Tapered point 32 is dimensioned to press fit into enlarged opening 38 when pump 10 is completely assembled. Tapered metering orifice 40 is configured to control the flow of fluid into tubular body 28.

In assembled form as shown in FIG. 3, plunger 12 is operatively disposed within syringe means 14 for reciprocal movement therein. Stop means comprising bar-like cross member 26 extends through apertures 34 on either side of barrel 30. As shown, bias means 42, compressed between suction head seal 22 and shoulder 44 of barrel 30 normally biases plunger means 12 outward relative to syringe means 14. Of course, bias means 42 may be mounted between thumb rest 20 and finger rest 30. The inner end of seal 22 and shoulder 44 cooperatively form suction head chamber 46. Disposable detachable measuring tube 16 is press-fitted to tapered point 32.

To operate, pump 10 is grasped by finger rests 30 and thumb rest 20. Plunger means 12 is depressed inwardly into syringe means 14 until bar-like cross member 26 engages the lower end of slots 34 to limit the inward movement of plunger means 12 relative to syringe means 14. As plunger means 12 moves inwardly, air is forced out of chamber 26 in advance of seal 22. Once chamber 46 is exhausted, tapered metering orifice 40 is placed in the fluid to be drawn to the predetermined measured volume. As pressure is released from thumb rest 20, bias means 42 forces plunger means 12 outward relative to syringe means 14 creating a vacuum in chamber 46 drawing fluid into detachable measuring tube 16 until bar-like cross member 26 engages the outer limit of slots 34.

The length of slots 34 determine the volume of fluid measured. It should be noted that at no time does the fluid enter syringe means 14. Thus, a single plunger means 12 and syringe means 14 may be used with several different detachable measuring tubes 16 without contaminating any of the fluid sample.

It will thus be seen that the objects set forth above, among those made apparent from the preceding description, are efficiently attained, and since certain changes may be made in carrying out the above method and article without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said said to fall therebetween.

Now that the invention has been described,
What is claimed is:

1. A volumetric measuring pump for measuring a predetermined fixed volume of fluid comprising: syringe means including limit means formed thereon, plunger means at least partially disposed within said syringe means for reciprocal movement therein, stop means removably connected to said plunger means so as to move therewith and disposed in engageable relation to said limit means to limit the reciprocal movement of said plunger means, said stop means comprising at least one pin element extending outwardly from the sides of said plunger means and removably mounted thereon, said limit means comprising at least one elongated aperture formed longitudinally in the side wall of said syringe means in substantially surrounding relation to said pin means, said pin means extending through said aperture such that the longitudinal extremes of said aperture engage said pin means, whereby longitudinal movement of said plunger means relative to said syringe means is regulated in opposite directions; a variable volume suction chamber defined by the relative dispositions of the inner portions of said plunger means in the inner end of said syringe means, said syringe means including attachment means formed thereon, a disposable measuring tube mounted on said syringe means by said attachment means, said suction chamber disposed in fluid communication with the interior of said disposable measuring tube, said plunger means being movable from a first to second position within said syringe means to evacuate fluid from at least a portion of said variable volume suction chamber, said plunger means being movable from said second to said first position to draw fluid into said evacuated portion of said suction chamber, seal means fixedly connected to said plunger and movably disposed on the interior of said syringe and further disposed in fluid sealing relation between said suction chamber and the remainder of said plunger, whereby fluid is drawin into said disposable measuring tube because of the sealed relation of said plunger and said suction chamber and fluid communicating relation between said suction chamber and said measuring tube.

2. The volumetric measuring pump of claim 1 wherein said syringe means comprises a hollow tubular body.

3. The volumetric measuring pump of claim 2 wherein said attachment means comprises a tapered portion on the lower end of said hollow tubular body.

4. The volumetric measuring pump of claim 2 wherein said plunger means comprises an elongated cylindrical barrel having a thumb rest formed on the outer portion thereof.

5. The volumetric measuring pump of claim 1 wherein said measuring tube comprises a detachable elongated hollow sleeve.

6. The volumetric measuring pump of claim 1 wherein said seal means is formed on one extremity of said plunger and is disposed in contiguous relation to said suction chamber.

7. The volumetric measuring pump of claim 1 further including bias means disposed on the interior of said suction chamber in biasing relation between said plunger means and said syringe means.

8. The volumetric measuring pump as in claim 1 further comprising bias means disposed on the exterior of said syringe means, substantially concentric to said plunger means and in biasing relation between said plunger means and said syringe means.

9. The volumetric measuring pump as in claim 1 further comprising mounting means in the form of a plurality of mounting channels disposed on said plunger means in spaced relation to one another, the relative dimension of said pin means and said mounting channels being such as to allow the moveable mounting of said pin means in each of said mounting channels, whereby the position thereof defines the displacement of said plunger means relative to said syringe means and the capacity of said suction chamber.

* * * * *